United States Patent [19]
Kennedy et al.

[11] Patent Number: 5,473,331
[45] Date of Patent: Dec. 5, 1995

[54] COMBINED SAR MONOPULSE AND INVERSE MONOPULSE WEAPON GUIDANCE

[75] Inventors: Thomas A. Kennedy, Manhattan Beach; Mark I. Landau; Howard Nussbaum, both of Los Angeles, all of Calif.

[73] Assignee: Hughes Aircraft Company, Los Angeles, Calif.

[21] Appl. No.: 332,004

[22] Filed: Oct. 31, 1994

[51] Int. Cl.$^6$ .............................. G01S 13/44; G01S 13/90
[52] U.S. Cl. .............................. 342/62; 244/3.19; 342/25; 342/149; 342/152
[58] Field of Search .............................. 244/3.14, 3.19; 342/25, 62, 149, 152

[56] References Cited

U.S. PATENT DOCUMENTS

| | | | |
|---|---|---|---|
| 4,589,610 | 5/1986 | Schmidt | 244/3.19 |
| 5,173,703 | 12/1992 | Mangiapane et al. | 342/25 |
| 5,424,742 | 6/1995 | Long et al. | 342/25 |

*Primary Examiner*—Stephen C. Bentley
*Attorney, Agent, or Firm*—Leonard A. Alkov; W. K. Denson-Low

[57] ABSTRACT

A system and method that provides for all-weather precision guidance of conventional air-to-surface weapons. The system and method employs a coherent monopulse radar disposed on a launch platform and a noncoherent passive (receive only) radar disposed on the weapon. The synthetic aperture radar generates a synthetic aperture radar monopulse map of an area around the target. The radar is used designate the location of the target, and transmit a sequence of alternating sum and simultaneous azimuth and elevation difference patterns centered on the target. The weapon includes a guidance system and seeker that is responsive to guidance commands transmitted by the synthetic aperture radar. The guidance system and seeker receives reflections of the alternating sum and combined azimuth and elevation difference pattern from the target, and the sum pulse is used by the weapon to acquire and track the azimuth and elevation difference pattern null on the target to fly an optimum trajectory to the target. One method for guiding a weapon to a target comprises the following steps. A synthetic aperture radar is used to generate a SAR monopulse map of a target area and designate a target therein. The weapon is then launched toward the target. The radar is used to transmit an interleaved sum and simultaneous azimuth and elevation difference pattern guidance pulse train at the target. The reflected interleaved sum and simultaneous azimuth and elevation difference pattern is received from the target at a seeker and guidance system on the weapon. The sum pattern is used by the weapon to lock onto the converging null, and is used by the launch platform to provide closed loop tracking of the target during guidance illumination. After weapon null lock-on, steering commands are generated to cause the weapon to fly an optimum trajectory to the target.

11 Claims, 3 Drawing Sheets

GUIDANCE PULSE TRAIN

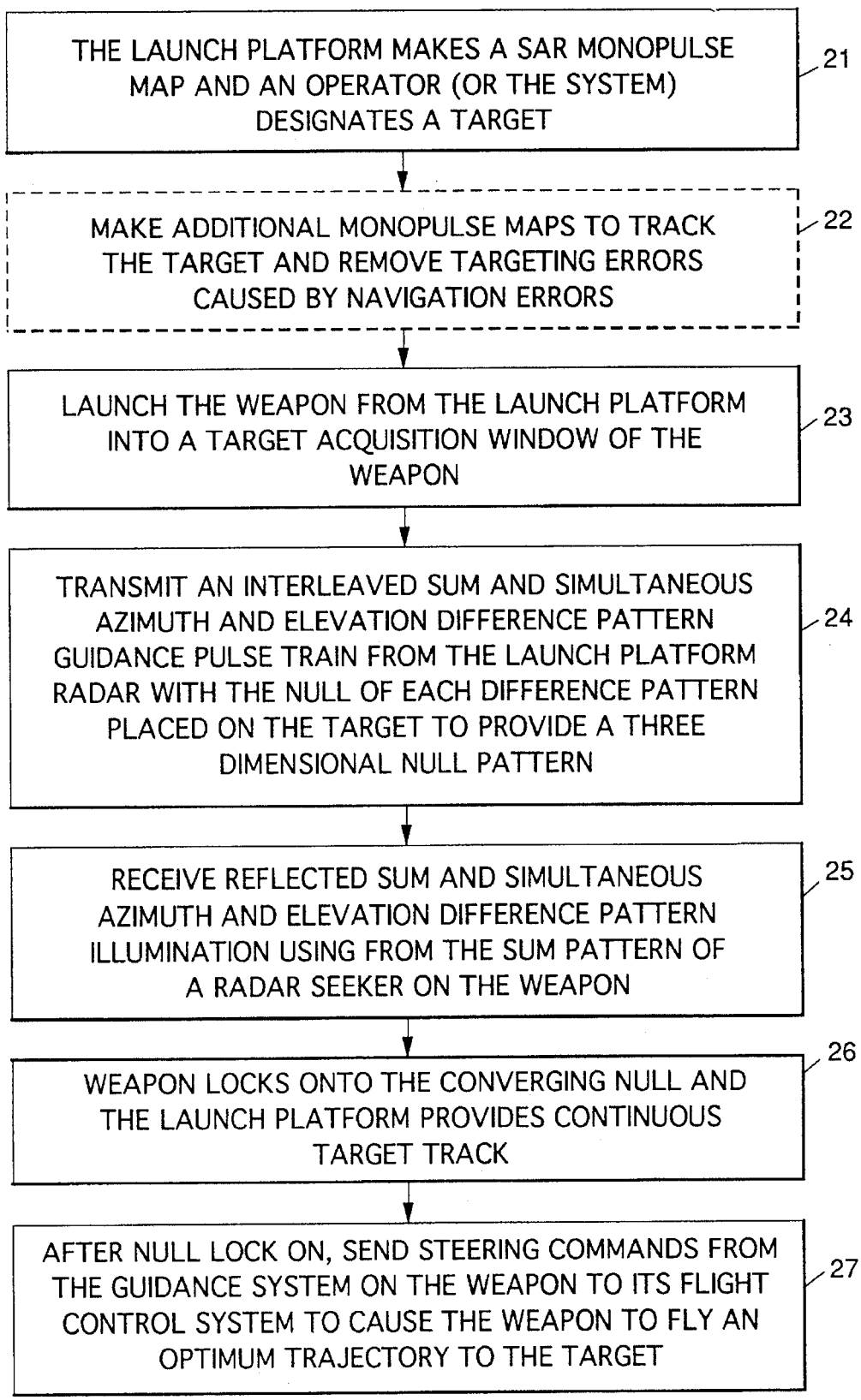

COMBINED SAR MONOPULSE AND INVERSE MONOPULSE WEAPON GUIDANCE

BACKGROUND

The present invention relates generally to weapon guidance systems and methods, and more particularly, to a system and method for guiding a weapon that employs synthetic aperture radar (SAR) monopulse and inverse monopulse guidance techniques.

Prior art relating to the present invention includes laser guided weapon systems, beam rider guidance techniques, and guidance techniques wherein radar sum pattern illumination of a target is provided by a launch platform. Laser designated/guided weapon approaches do not operate in all types of weather thereby limiting operational effectiveness. Also, conventional guidance schemes do not support multiple precision weapon deliveries against single and multiple targets. This further limits their operational effectiveness. Conventional systems that use sum pattern only illumination guidance have problems wherein the seeker locks onto a stronger RF scatterer near the true target, and thus misses the target.

Therefore it is an objective of the present invention to provide for a system and method for guiding a weapon that supports multiple precision weapon deliveries against single and multiple targets and that operates in all types of weather. It is a further objective of the present invention to provide for a system and method for guiding a weapon employing SAR monopulse and inverse monopulse guidance techniques.

SUMMARY OF THE INVENTION

In order to meet the above and other objectives, the present invention comprises a system and method that provides for all-weather precision guidance of conventional air-to-surface weapons. The system and method of the present invention employs a coherent monopulse radar disposed on a launch platform and a non-coherent passive (receive only) radar disposed on the weapon. More specifically, the present system is a SAR monopulse and inverse monopulse weapon guidance system for guiding a weapon to a target. The SAR monopulse technique provides three dimensional designation and tracking of the target by the launch platform. The inverse monopulse technique provides a semi-active guidance illumination of the target which is used by the weapon to determine its intercept geometry.

The system comprises a launch platform, and a synthetic aperture radar with simultaneous monopulse receive capability disposed on the launch platform that generates a synthetic aperture radar monopulse map of an area surrounding the target. The radar is used designate the location of the target, and transmit the inverse monopulse illumination which is comprised of a sequence of alternating sum and simultaneous azimuth and elevation difference patterns centered on the target. The system comprises a weapon that includes a guidance system and a low cost noncoherent radar seeker that is responsive to guidance commands transmitted by the launch platform. The weapon guidance system and seeker receives reflections of the alternating sum and combined azimuth and elevation difference pattern from the target, and uses these reflections to acquire and track the azimuth and elevation difference pattern null on the target to fly an optimum trajectory to the target.

One method for guiding a weapon to a target comprises the following steps. A launch platform synthetic aperture radar is used to generate a SAR monopulse map of a target area and designate a target therein. The weapon is then launched toward the target. The launch platform radar is also used to transmit an interleaved sum and simultaneous azimuth and elevation difference pattern guidance pulse train at the target. The reflected interleaved sum and simultaneous azimuth and elevation difference pattern is received from the target by the seeker and guidance system on the weapon. The sum pattern return is used by the weapon to lock onto the converging null generated by the simultaneous azimuth and elevation difference pattern. Sum pattern returns are also used by the launch platform to provide continuous track of the target via SAR monopulse maps. After null lock-on, steering commands are generated to cause the weapon to fly an optimum trajectory to the target.

In the method of the present invention the radar on the launch platform transmits an interleaved sum pattern and simultaneous azimuth and elevation difference pattern to provide the weapon with a three dimensional converging null signal centered on a target. The weapon uses the null signal to determine an optimum trajectory to the target. Initial ground target acquisition is made using a SAR monopulse map generated by the radar that provides an image of the target area as well as monopulse angle information for each pixel in the scene containing the target. Thus the designated target location relative to the radar antenna electrical boresight of the launch platform's radar antenna is known very accurately. This accurate knowledge of the target relative to the radar antenna electrical boresight provides the capability to precisely place the converging null of the simultaneous azimuth and elevation pattern on the target. The convolution of the simultaneous azimuth and elevation pattern with the seeker's sum pattern yields the inverse monopulse.

The present invention provides all weather precision air-to-ground/surface weapon delivery that is as accurate as laser designated approaches without requiring a weapon data link. Also, the present guidance technique supports multiple precision weapon deliveries against single and multiple targets. The use of the inverse monopulse approach of the present invention eliminates problems relating to sum pattern only target illumination guidance techniques. The present invention thus provides for a weapon delivery system and method that has improved operational effectiveness.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 illustrates guidance system control of the weapon after null lock-on; and FIG. 5 illustrates a flowchart illustrating one method in accordance with the principles of the present invention.

DETAILED DESCRIPTION

Figure 1:
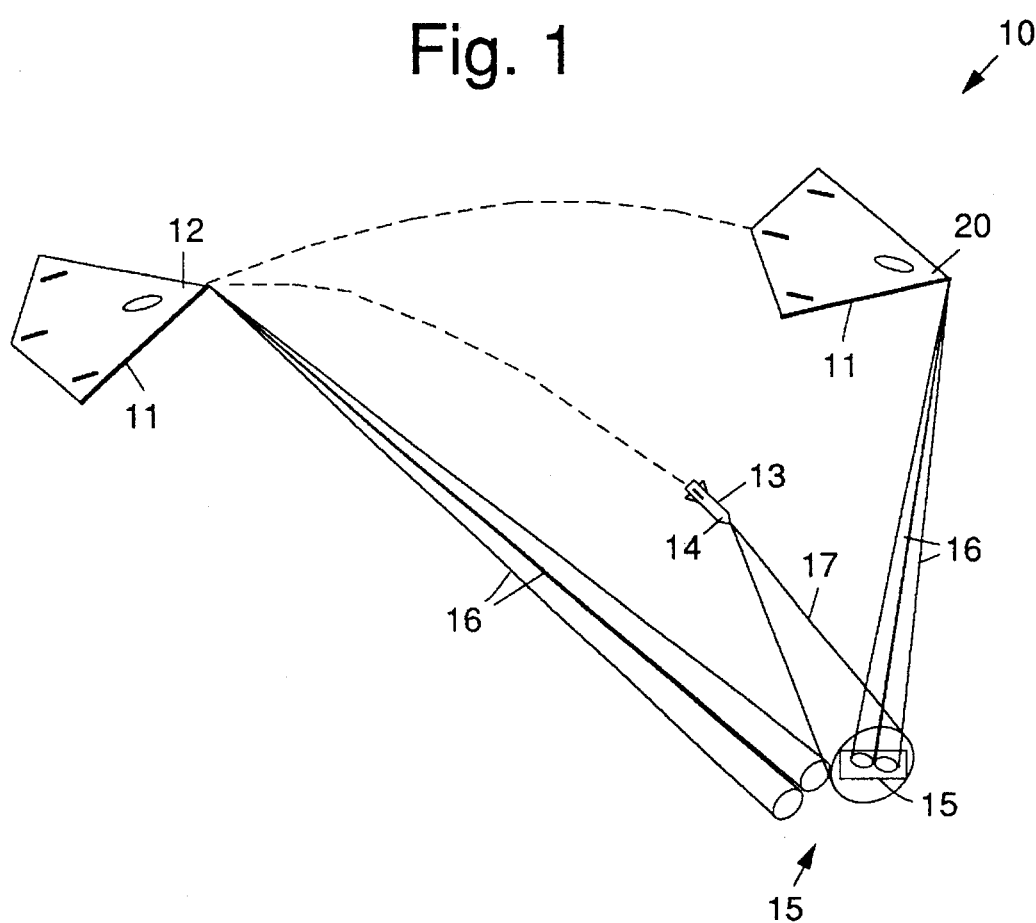
FIG. 1 illustrates a SAR monopulse and inverse monopulse weapon guidance system and method in accordance with the principles of the present invention.

Referring to the drawing figures, FIG. 1 illustrates a SAR monopulse and inverse monopulse weapon guidance system 10 and method 20 in accordance with the principles of the present invention for guiding a weapon 13 to a target 15. The system is comprised of a synthetic aperture radar (SAR) 12 including a radar antenna (not shown) disposed on a launch platform 11 or vehicle 11 that carries the weapon 13. The weapon 13 comprises a guidance system 14, such as a passive noncoherent radar seeker 14, for example, that is responsive to guidance commands transmitted by the synthetic aperture radar 12.

Synthetic aperture radar (SAR) monopulse provides three-dimensional target location data relative to an electrical boresight of the SAR radar antenna. This is accomplished using a SAR mapping radar 12 on the launch platform 11 having simultaneous monopulse receive capability. The SAR mapping radar 12 transmits a normal SAR waveform but receives azimuth and elevation monopulse data (difference data) in addition to the normal sum data. Both the sum data and azimuth and elevation monopulse data are processed to form a SAR map that has an elevation angle and azimuth angle for each map pixel relative to the electrical boresight of the radar antenna. Thus, the range, azimuth, and elevation relative to the antenna electrical boresight are known for each designated target 15. Knowledge of the location of the target 15 relative to the electrical boresight of the radar antenna mitigates misalignment of the guidance illumination relative to the target 15 since the same antenna used to acquire and designate the target 15 and to provide guidance illumination. SAR monopulse is performed to acquire and track the fixed target 15 so that the null of the inverse monopulse illumination generated null pattern can be accurately centered on the target 15.

Inverse monopulse guidance is accomplished by having the launch platform 11 provide an illumination of the target 15 that is comprised of a pulse train with alternating sum pattern and simultaneous (or sequential) azimuth and elevation difference patterns centered on the target 15, and by having the weapon 13 receive the reflected energy through the sum pattern of its seeker 14 and process the received data to form angle measurements. The transmission of the simultaneous azimuth and elevation difference patterns yields a null pattern which is centered on the target 15 by the launch platform 11. The process of transmitting the sum and difference patterns from the launch platform 11 and receiving on the sum pattern of the seeker 14 yields an inverse monopulse measurement which is used to derive the azimuth and elevation angles of the target 15 relative to the seeker's antenna. This information is then used by the weapon's guidance system 14 to determine the optimal trajectory to interdict the target 15. The launch platform 11 may use the transmitted reflections to form SAR monopulse maps for fixed target tracking or to perform moving target tracking. Thus, inverse monopulse guidance may be used against fixed or moving targets 15.

During operation of the SAR monopulse and inverse monopulse weapon guidance system 10 depicted in FIG. 1, the synthetic aperture radar 12 on the launch platform 11 generates a synthetic aperture radar monopulse map (a SAR map with azimuth and elevation monopulse for each pixel) of an area around the target 15 (the target area 15). Either the system 10 (automatically) or an operator (manually) designates the target 15 in the SAR map. Elevation and azimuth monopulse data and range data of the target 15 are used to determine a targeting cue that provides for inverse monopulse guidance in accordance with the present invention. To reduce targeting errors due to navigation system drifts of the launch platform 11, additional SAR monopulse maps may be made as the launch platform 11 approaches the target 15 while either automatic or operator assisted tracking of the target 15 is performed. A single radar 12 is used to map, designate and track the target 15 and perform semi-active illumination or the target 15. Consequently, misalignment errors normally associated with cueing are eliminated.

Figure 2:
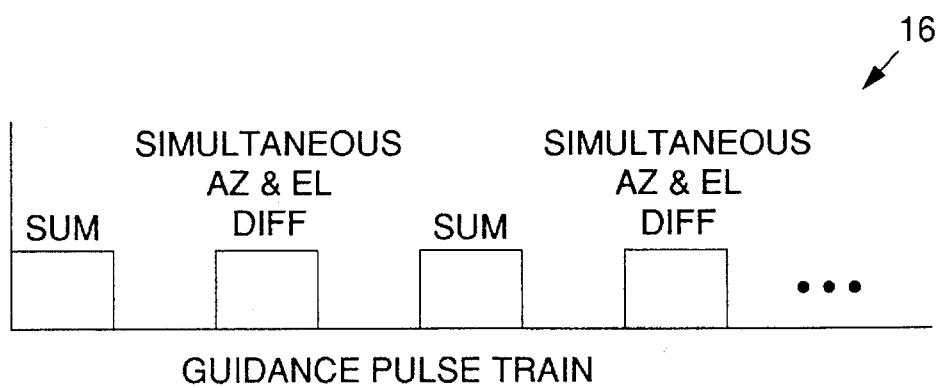
FIG. 2 illustrates a launch platform RF pulse transmission sequence employed in the present invention.

After release of the weapon 13 from the launch platform 11, the launch platform 11 transmits a sequence of alternating sum and simultaneous azimuth and elevation difference patterns centered on the target 15 to perform inverse monopulse guidance. The alternating sum and simultaneous azimuth and elevation difference patterns are shown in FIG. 2. More specifically, FIG. 2 illustrates an RF pulse transmission sequence employed in the present invention. Interleaved sum and simultaneous azimuth and elevation difference patterns are transmitted at the target 15 by the radar 12 on the launch platform 11. The sum pulse transmission is used to aid the weapon 13 in acquiring and tracking the azimuth and elevation difference pattern null and is used by the launch platform 11 to form SAR monopulse maps to support closed loop tracking of the target 15 during guidance illumination.

The azimuth and elevation difference patterns are transmitted simultaneously with the center (null) of each difference pattern placed on the target 15. This generates a pattern surrounding the target 15 having the target 15 at the center of the null. One technique to generate the null is via simultaneous azimuth and elevation difference pattern transmission, accomplished by dividing the aperture of the radar antenna into four quadrants and placing 90° phase shifts between each adjacent quadrant during RF transmission as is shown in FIG. 3.

Figure 3:
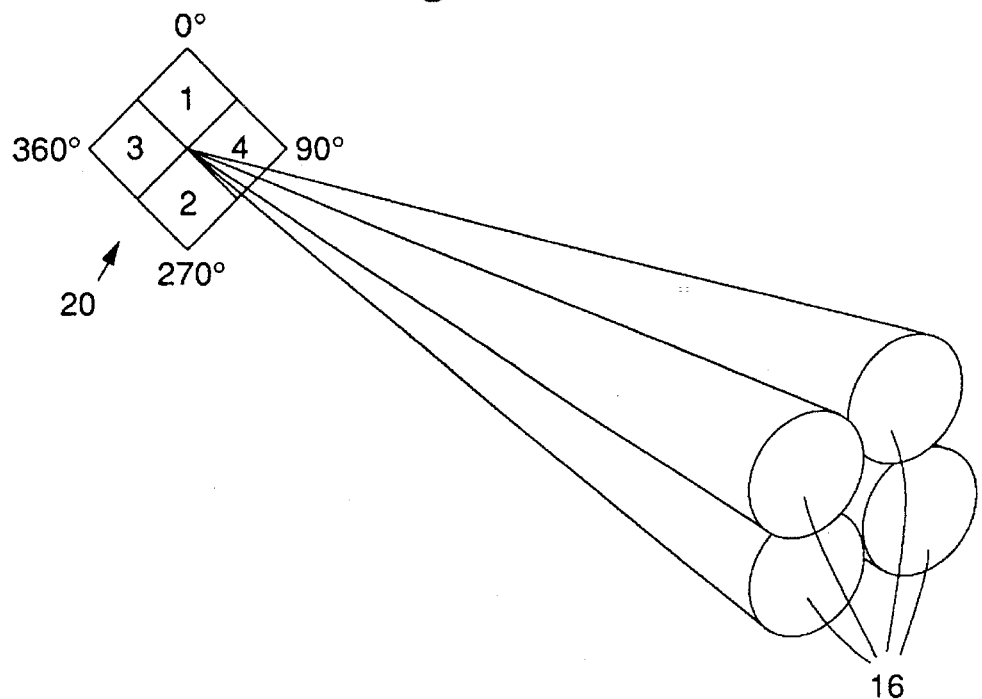
FIG. 3 illustrates one subaperture implementation technique used to support simultaneous azimuth and elevation difference pattern generation in accordance with the principles of the present invention.

More specifically, FIG. 3 illustrates one subaperture implementation of the present invention that supports simultaneous azimuth and elevation difference pattern (null pattern) generation. Antenna quadrant definition and quadrant relative phasing definition is shown in FIG. 3. The 90° relative phase between adjacent quadrants produces a three dimensional null pattern. The array is divided into quadrants and each quadrant is out of phase with respect to its neighbor quadrant by 90°. The resulting transmitted pattern has a three dimensional null at its center. This null is placed on the target 15 by the radar 12 on the launch platform 11.

Figure 4:
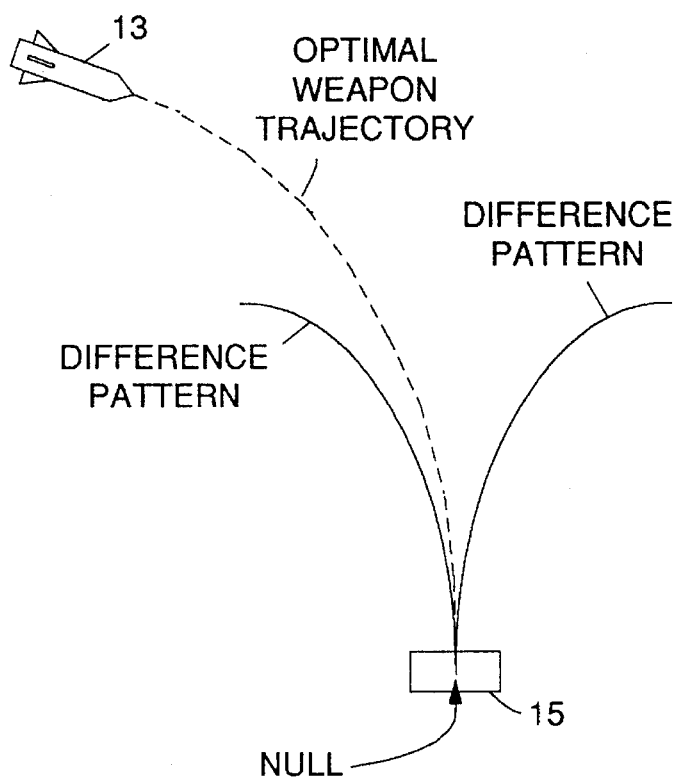

A passive noncoherent radar seeker 14 on the weapon 13 receives reflections of the alternating sum and combined azimuth and elevation difference pattern illumination of the target 15. The seeker 14 uses this information to determine the angular location of the target 15 relative to the weapon 13. The guidance system 14 on the weapon 13 uses target angle information to determine appropriate control surface deflections to cause the weapon 13 to fly an optimum trajectory to the target 15. FIG. 4 illustrates guidance system control of the weapon 13 after null lock-on relative to the null in the difference pattern.

Use of the combined sum and simultaneous azimuth and elevation difference pattern illumination of the target 15 eliminates problems associated with guidance schemes using sum only illumination of the target 15. Sum pattern only illumination guidance problems include the seeker 14 locking onto a stronger RF scatterer near the target 15. In the system 10 and method 20 of the present invention, the sum pattern illumination is used by the weapon 13 to provide coarse guidance to the location of the target 15 so that the weapon 13 acquires the correct simultaneous azimuth and elevation difference pattern null to generate the precision guidance information.

The present radar weapon guidance system 10 and method 20 provides for all-weather, precision weapon guidance against ships and ground based targets 15 whose effectiveness approaches the accuracy of clear weather laser guided weapon guidance systems. The all-weather and homing benefits of the present invention provide a distinct advantage over conventional guidance schemes that cannot operate in all weather conditions such as laser guided weapon systems, and guidance schemes that do not provide homing type guidance, such as beamrider, and command-to-line of sight systems. The present invention has a distinct advantage over non-homing guidance systems since it does not require the weapon 13 to fly along a line-of-sight between the launch platform 11 and the target 15. Thus, the present invention may be used with unpowered (glide) weapons 13 because it allows ballistic-type weapon trajectories. Also, the present invention may be implemented rising a noncoherent radar weapon seeker 14 which reduces weapon 13 and seeker 14 costs and does not require sophisticated timing synchronization between the launch platform 11 and the weapon 13.

Combined SAR monopulse and inverse monopulse guidance in accordance with the present invention supports multiple weapon deliveries against a single target 15 or multiple targets 15 within the weapon target acquisition window (delivery basket). Multiple weapon deliveries against a single target 15 are achievable because, unlike lasers, the radar signal is not significantly dispersed or attenuated by tire or smoke associated with initial weapon impact. Multiple target weapon delivery is achieved by assigning each weapon 13 its own frequency and time-sharing the inverse monopulse guidance illumination with each target 15. The present invention thus provides an all-weather precision weapon guidance system 10 and method 20 that provides a significant improvement over beamrider guidance techniques, platform 11 sum pattern only illumination of target guidance techniques and laser guided weapon techniques.

For the purposes of completeness, and referring to FIG. 5, it is a flowchart illustrating one method 20 in accordance with the principles of the present invention. The steps in the method 20 are as follows. The launch platform 11 makes a SAR monopulse map and an operator (or the system 10) designates a target 15 (step 21). Additional maps may be optionally made to track the target 15 and remove targeting errors due to navigation errors (step 22). The launch platform 11 launches the weapon 13 into the target acquisition window of the weapon 13 (step 23). The radar 12 on the launch platform 11 transmits an interleaved sum and simultaneous azimuth and elevation difference pattern guidance pulse train (step 24). Four simultaneous beams, one from each quadrant, are transmitted to form interleaved sum and simultaneous azimuth/elevation difference patterns. The sum pattern transmission is used to ensure that the seeker 14 on the weapon 13 acquires the three-dimensional null, and is used by the launch platform 11 to provide closed loop tracking of the target 15 during guidance illumination. The simultaneous azimuth (quadrant 3—quadrant 4) and elevation (quadrant 1—quadrant 2) difference patterns are transmitted with the null of each difference pattern placed on the target 15 yielding the three dimensional null pattern. Adjacent quadrants have a relative phase shift of 90° to provide adjacent quadrant recoupling. The radar seeker 14 on the weapon 13 receives reflected illumination by way of its seeker's sum pattern (step 25) and locks on to the converging null (step 26). After null lock on, the guidance system 14 on the weapon 13 sends steering commands to a flight control system of the weapon 13 to cause it to fly an optimum trajectory to the target 15 (step 27).

Thus there has been described a new and improved system and method for guiding a weapon that employs SAR monopulse and inverse monopulse guidance techniques. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A SAR monopulse and inverse monopulse weapon guidance system for guiding a weapon to a target, said system comprising:

a launch platform;

a synthetic aperture radar disposed on a launch platform for generating a synthetic aperture radar monopulse map of an area surrounding the target, for designating the location of the target, and for transmitting an inverse monopulse illumination that is comprised of a sequence of alternating sum and simultaneous azimuth and elevation difference patterns centered on the target;

a weapon comprising a weapon guidance system and noncoherent radar seeker that is responsive to guidance commands transmitted by the launch platform, for receiving reflections of the alternating sum and combined azimuth and elevation difference pattern from the target, and for using these reflections to acquire and track the azimuth and elevation difference pattern null on the target so as to fly an optimum trajectory to the target.

2. The system of claim 1 wherein the guidance system comprises a passive noncoherent radar seeker.

3. The system of claim 1 wherein the radar generates the simultaneous azimuth and elevation difference patterns by dividing the radar antenna aperture into four quadrants and placing 90° phase shifts between each adjacent quadrant during transmission.

4. The system of claim 3 wherein the 90° relative phase between adjacent quadrants produces the three dimensional null pattern.

5. A method for guiding a weapon to a target, said method comprising the steps of:

using a synthetic aperture radar to generate a SAR monopulse map of a target area and designating a target therein;

launching the weapon toward the target;

using the synthetic aperture radar to transmit an interleaved sum and simultaneous azimuth and elevation difference pattern guidance pulse train at the target;

receiving a reflected interleaved sum and simultaneous azimuth and elevation difference pattern from the target at a seeker and guidance system on the weapon; locking onto a converging null using the sum pattern; and after null lock-on, generating steering commands to cause the weapon to fly an optimum trajectory to the target.

6. The method of claim 5 further comprising the step of:

continuously tracking the target by way of SAR monopulse maps generated by the synthetic aperture radar using the sum pattern returns.

7. The method of claim 5 further comprising the step of: making additional maps to track the target and remove targeting errors due to navigation errors.

8. The method of claim 5 wherein four simultaneous beams, one from each quadrant, are transmitted to form the interleaved sum and simultaneous azimuth/elevation difference pattern.

9. The method of claim 5 wherein the sum pattern is used to ensure that the seeker acquires the three-dimensional null.

10. The method of claim 9 wherein the simultaneous azimuth and elevation difference patterns are transmitted with a null of each difference pattern placed on the target to provide the three dimensional null pattern.

11. The method of claim 10 wherein adjacent quadrants have a relative phase shift of 90° to provide adjacent quadrant decoupling.

\* \* \* \* \*